Jan. 2, 1962

B. HOFFMANN 3,015,490

CENTRAL RECORD SPINDLE FOR RECORDS HAVING A LARGE CENTRAL APERTURE

Filed Nov. 7, 1955

3 Sheets-Sheet 1

INVENTOR

BRUNO HOFFMANN

BY

AGENT

Jan. 2, 1962 B. HOFFMANN 3,015,490

CENTRAL RECORD SPINDLE FOR RECORDS HAVING A LARGE CENTRAL APERTURE

Filed Nov. 7, 1955 3 Sheets-Sheet 2

INVENTOR

BRUNO HOFFMANN

BY

AGENT

Jan. 2, 1962 B. HOFFMANN 3,015,490

CENTRAL RECORD SPINDLE FOR RECORDS HAVING A LARGE CENTRAL APERTURE

Filed Nov. 7, 1955 3 Sheets-Sheet 3

INVENTOR
BRUNO HOFFMANN
BY

AGENT

United States Patent Office 3,015,490
Patented Jan. 2, 1962

3,015,490

CENTRAL RECORD SPINDLE FOR RECORDS HAVING A LARGE CENTRAL APERTURE

Bruno Hoffmann, Berlin-Charlottenburg, Germany, assignor, by mesne assignments, to North American Philips Company, Inc., New York, N.Y., a corporation of Delaware Filed Nov. 7, 1955, Ser. No. 545,457
Claims priority, application Germany Nov. 10, 1954
3 Claims. (Cl. 274—10)

For playing records having a large central aperture on a record changer, record spindles have already been suggested which comprise a housing and a rod secured thereto, which carries the housing above the turntable. The housing comprises at least two main supports for carrying the pile of records and at least two blade-like auxiliary supports spaced from the main supports over a distance corresponding approximately to the thickness of the records to be played. The lowest record of the pile is released by that the main supports are withdrawn into the housing and at the same time the auxiliary supports are moved between the lowest and the subsequent record, the movement of the supports being controlled by a pin journalled in the spindle.

The supports are of uniform shape and comprise small thin plates having a slot-shaped aperture accommodating a cam coupled to the pin. The plates are arranged in part to be inverted with respect to the position of the other plates, the arrangement being such that a relative movement of the pin with respect to the housing in the plane of the plates results in the required movement of the plates and the supports, respectively.

It has been found that such record spindles have a disadvantage, more particularly if the rod carrying the housing and containing the operating pin, instead of being rigidly secured to the housing, is used as a spindle for records having a central aperture of normal size, while for playing records having a large central aperture, the record spindle according to the invention is slipped onto the rod, since in this case, after the pile of records has been played, difficulties arise in removing the played records from the turntable and from the spindle, respectively. Since either the main supports or the auxiliary supports always project from the housing of the record spindle, the played records cannot be lifted upwards, so that the spindle must first be removed before the pile of records can be taken from the turntable.

According to the invention, said disadvantage is obviated by the fact that the plate-shaped main supports extending in the direction of the axis of the spindle has a thickness greater than that of the auxiliary supports and are bevelled downwards on the side projecting from the housing, the slot-shaped aperture provided in each main support being widened to the exterior in such manner that the main support can be moved inwards against the force of a spring acting thereupon from the interior. With a spindle arranged in this manner, the records after being played can readily be removed upwards along the spindle which remains on the turntable. The auxiliary supports in this case are no obstacles and the main supports are thus arranged in the housing of the spindle in a resilient manner and hence pushed inwards owing to their downward bevelled edges when the record or the pile of records is removed.

It is advantageous if the slot-shaped aperture provided in each main support when use is made of plate-shaped body connected to the control pin and comprising cams accommodated in the slots of the supports has the shape of a rectangular triangle, along the inner bevelled side of which the cam slides and of which the outer side is properly spaced from the outer side of the cam.

With such record spindles, it is usually advantageous if the supports project from the housing over a comparatively large distance, otherwise the edge of the central aperture is readily liable to be damaged after a short operating period. If the record spindle for operating the supports is provided with a plate-shaped body connected to the control pin, which body carries cams accommodated in the slots of the supports and sets the supports into movement due to the cams sliding along a corresponding bevelled side it is thus possible to obtain only a limited stroke of the supports since for obtaining a larger stroke, the side of the slot along which the cam slides would have to be correspondingly more inclined and this would result in a considerable increase in frictional resistance. If the slots are made even more inclined, operation of the supports is no longer possible at all.

In order to improve this, a record spindle according to the invention may alternatively be so designed that the slot-shaped aperture of the support, which is widened to the exterior, constitutes an abutment for the securing pin which is provided on a lever and which by means of the lever pivoted in the housing and by means of a second pin likewise provided on the lever is coupled to a plate-shaped body rigidly, connected to the control pin. In this case no use is made of a wedge effect for transmission of the movement of the control pin to the supports, but for this purpose a lever is provided. The limit value of the frictional angle is thus immaterial and the stroke of the individual support may be chosen larger by corresponding proportioning of the lever arm.

The levers are preferably given the shape of substantially triangular plates each having a bore for the pin rigidly secured to the housing, a unilateral driving pin and two bi-lateral driving pins projecting from the upper and lower sides of the record. It is in this case necessary that each support has a recess for the free mobility of the pin which is not required for operating the support. This affords the advantage that levers of uniform construction may be used for all supports, so that the manufacture of the record spindle becomes cheaper and also the assembling operation is simplified, since the insertion of the individual lever needs no special attention.

In order that the invention may be readily carried into effect, it will now be described, by way of example, with reference to two embodiments shown in different forms in the accompanying drawings.

Figures 1, 2, 3, 4:
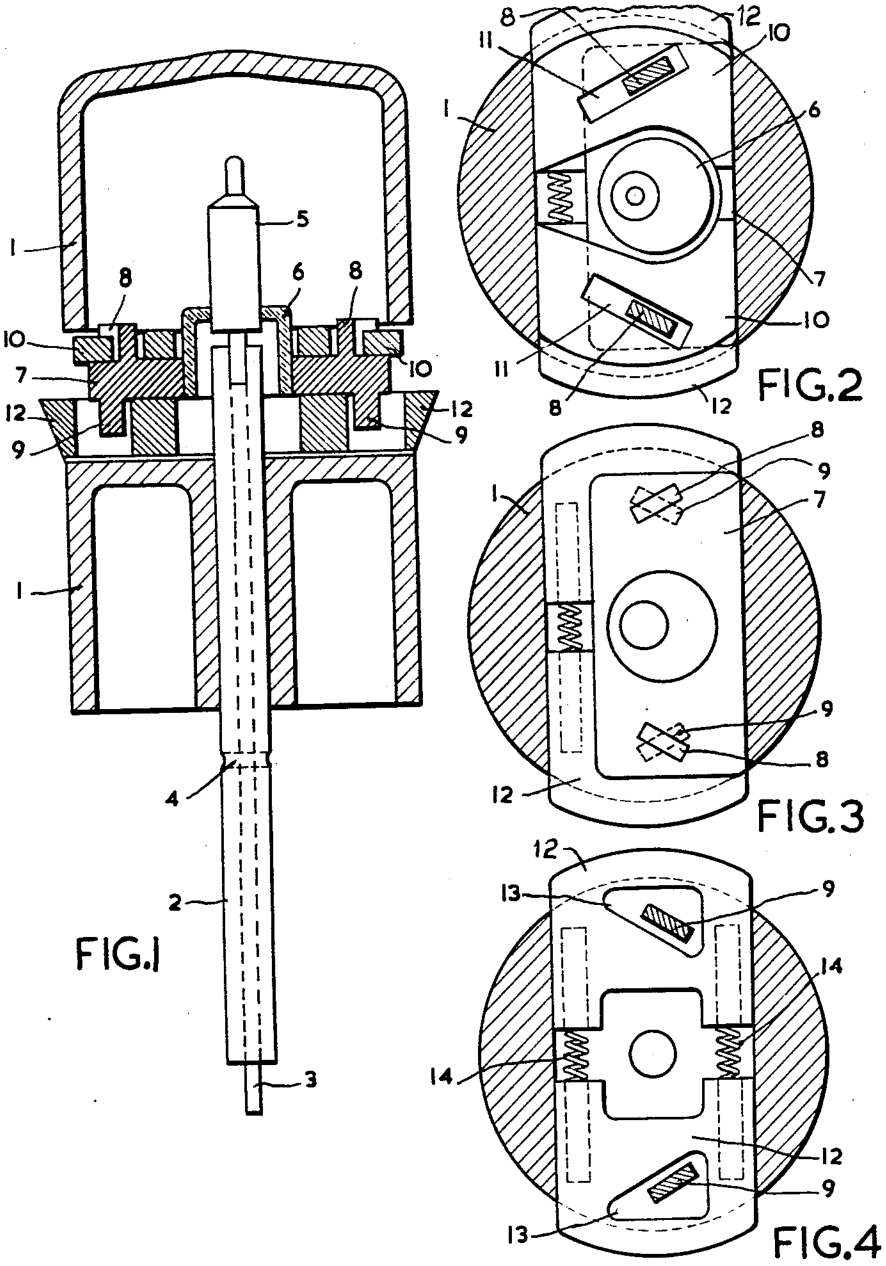
FIG. 1 shows a record spindle having inclined slots provided in the supports which are operated by cams extending therein.
FIG. 2 is a sectional view of the spindle shown in FIG. 1, which shows the auxiliary supports and their driving means.
FIG. 3 is a sectional view of the spindle shown in FIG. 1 which shows the operating plate and the cams.
FIG. 4 is a sectional view of the spindle shown in FIG. 1 which shows the main supports and their driving cams.
Figure 5:
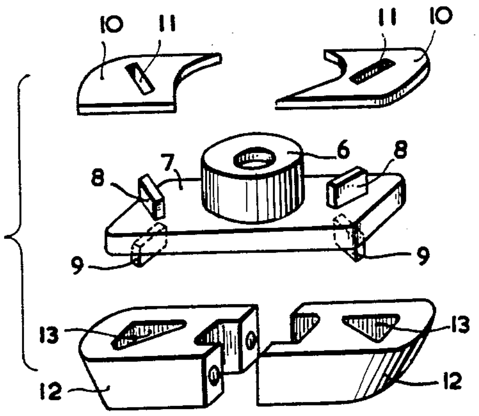
FIG. 5 is a perspective view of the supports and the operating plate.

In FIGS. 1 to 5, the record spindle comprises a housing 1, constituted by two parts, which are united in a manner not shown, for example by means of screws. The housing is slipped onto a rod, 2 which is fixed in position in a central aperture of the turntable of the grammophone. The rod 2 contains in a corresponding longitudinal slot a control pin 3, which is pivotally arranged upon a journal 4 and with its end projecting below from the rod may be pivoted by means of the record-changing mechanism. At its upper extremity, the pin 3 carries an extension 5, which brings about displacement of the support.

For this purpose, part 5 is coupled via a recipient-like cover 6 to a plate-shaped body 7, which comprises cams 8 and 9 on its upper side and lower side, respectively. Provided on the plate-shaped body 7 are auxiliary supports 10 which accommodate the cams 8 in suitably-shaped inclined slots 11.

Below the plate-shaped body 7 there are provided main supports 12, which also have slots 13 for accommodating the cams 9 projecting downwards. The two main supports are pushed away from one another by means of springs 14, so that the inclined sides of the slots 13 which are provided therein and are enlarged to form a triangle, engage the inner flanks of the cams 9. The main supports are bevelled downwards on the sides projecting from the housing 1, as may best be seen from FIG. 1.

When a pile of records is placed on the housing 1, the lowest record lies, with its inner edge, on the upper surfaces of the main supports 12. Upon operation by means of the changing mechanism, the pin 3 is turned, resulting in a displacement of the operating plate 7 from its rest position (at the right in FIGS. 2, 3 and 4) into its operating position, that is to say to the left. Consequently, the cams in the position shown also move to the left pushing the main supports to the interior and the auxiliary supports to the exterior. The latter thus move between the lowest and the subsequent higher record of the pile of records, while furthermore the support for the lowest record disappears and this record can thus fall freely downwards. When the pin 3 is turned back into its rest position, the operating plate 7 is displaced to the right, the main supports are moved to the exterior by the springs 14 and the auxiliary supports are withdrawn into the housing 1. The pile of records, which has been supported in the meantime by the auxiliary supports, then falls upon the main supports and the device is ready again for the subsequent record change.

When all records have been played, the pile of records which is now located on the turntable, may be lifted along the record spindle. When the pile is moved upwards, the edge of the central aperture of the upper record abuts against the bevelled edges of the main supports 12, urging them into the housing on account of wedge-effect, whereby the springs 14 are compressed. The pile of records may thus readily be lifted upwards and the main supports are again pushed to the exterior by the springs 14 immediately after the lowest record of the pile has passed. The shape of the triangular slots 13 provided in the main supports must be chosen such that the cams which remain in the rest position cannot abut against the boundary of the slot even when the main supports are pushed to the interior.

With such a record spindle, the stroke of the operating plate 7 is usually determined, since the record spindle is constructed to be slipped onto the rod 2. The rod 2 is designed for changing records having a central aperture of normal diameter and the pivotal movement of the pin 3 is thus determined. Since, on the other hand, the supports must perform a maximum stroke in order to give sufficient support to the records resting upon them, it is advantageous for the angle of the slots 11 and 13, respectively, to be chosen as large as possible. However, there is a limit value which is determined by the frictional coefficient between the cams 8 and 9 respectively and the edge of the slot.

Figures 6, 7, 8, 9:
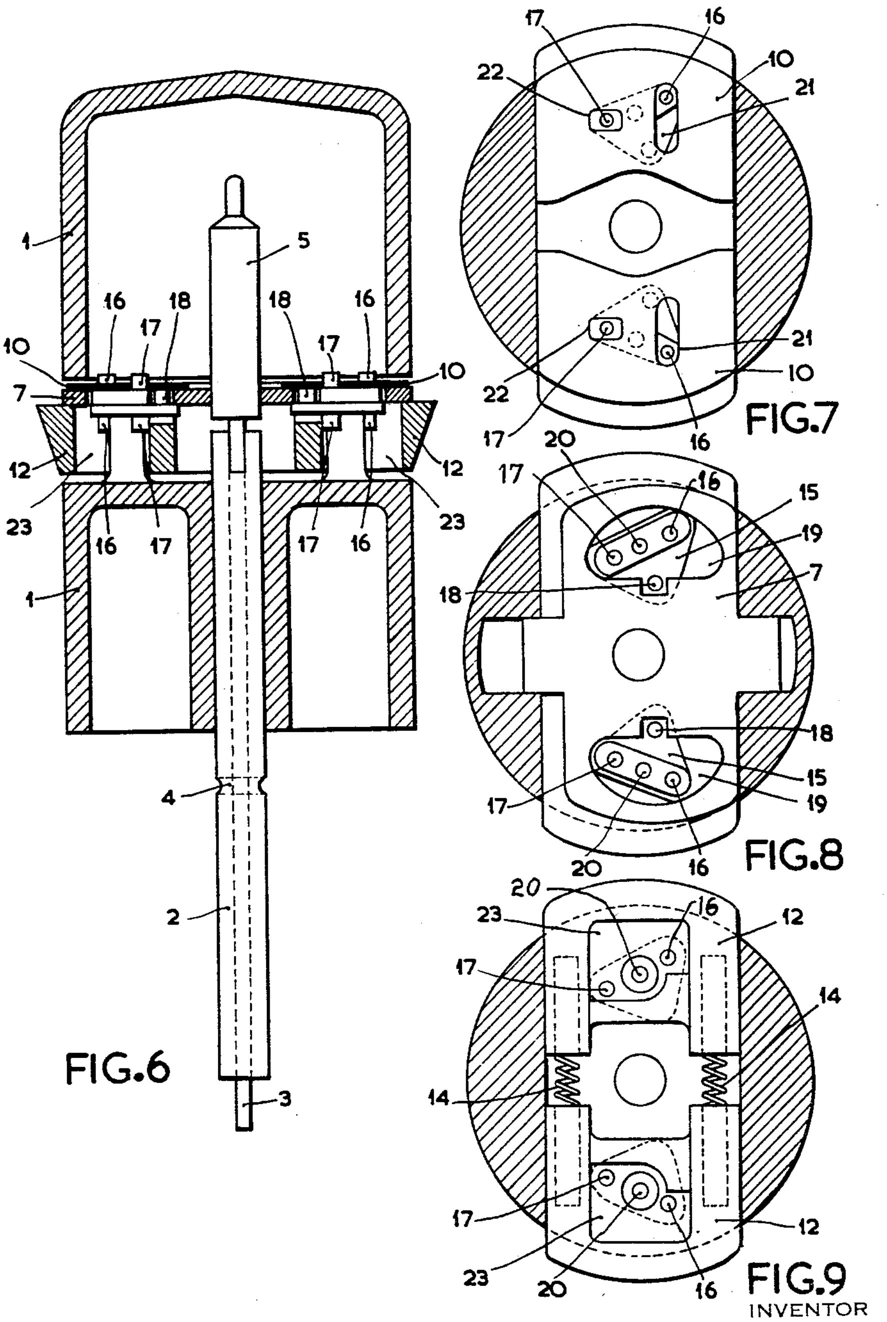
FIG. 6 shows a spindle with levers for driving the supports.
FIG. 7 is a sectional view of the spindle of FIG. 6 at the level of the auxiliary supports.
FIG. 8 is a sectional view of the spindle of FIG. 6 at the level of the operating plate.
FIG. 9 is a sectional view of the spindle of FIG. 6 at the level of the main support and FIG. 10 is a perspective view of the supports, the operating plate and the levers of the spindle shown in FIG. 6.
Figure 10:
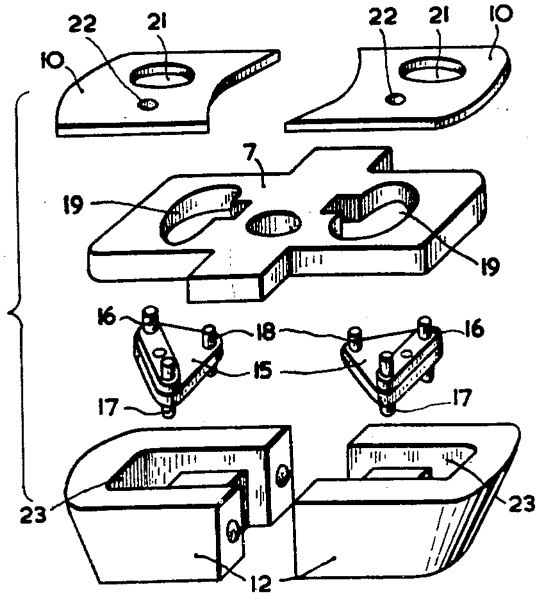

A larger stroke of the support may be obtained with a record spindle as shown in FIGS. 6 to 10. In these figures, the same reference numerals are used as in FIGS. 1 to 5, so far as identical parts are concerned.

In these figures, levers 15 are provided for the transmission of the sliding movement of the operating plate 7 to the supports 10 and 12. The levers each comprise a substantially triangular plate having pins 16, 17, 18 of which the pins 16 and 17 project above and below from the plate, whereas the pin 18 is somewhat shorter and furthermore projects only above the plate. The operating plate 7 has a recess 19 such that the journals 16 and 17 can move freely in the recess, but the journal 18 is taken along when the operating plate 7 is displaced. A pin 20 secured in the lower part of the spindle housing 1 serves as a journal for the lever.

The auxiliary supports 10 each have a longitudinal slot 21 and a transverse slot 22, into which the journals 16 and 17 extend. When the plate 7 is operated, the lever 15 thus pivots upon its journal 20 and the journal 17 moves the auxiliary support 10 to the exterior or to the interior according to the direction of displacement of the plate 7.

The main supports 12 each have a recess 23 which constitutes an abutment for the journal 16 which extends downwards. The recess 23 is so spacious that the journal 17 can move freely in it. When the lever 15 is pivoted, the support 12 is thus moved to the interior by the pin 16. The support 12 thus performs a movement opposite to the movement of the auxiliary support 10, which takes place at the same time, the recess 23 of the main support 12 being so proportioned that the support by means of a pressure exerted thereupon from the exterior may readily be moved completely into the housing 1, in order to enable the pile of records to be removed upwards from the spindle. The lever 15 may readily be so proportioned as to obtain a sufficiently large stroke of the support.

What is claimed is:

1. In an automatic record changer, a hollow record spindle arrangement located above a turntable comprising a housing, at least two apertured main supports and at least two apertured auxiliary supports in said housing, each pair of main supports and each pair of auxiliary supports being adapted to move laterally in opposite directions, a plate-shaped member located between said main and auxiliary supports and spacing the same apart a distance equal to the thickness of a record to be played, a control pin journalled for pivotal movement in said spindle, two levers each having a unilateral driving pin and two bilateral driving pins thereon, the latter projecting above and below said levers respectively, at least some of said pins projecting into the apertures of both said main supports and auxiliary supports, said levers being operatively connected to said control pin through said plate-shaped member whereby movement of said control pin results in the lateral movement of said supports.

2. In an automatic record changer, a hollow record spindle arrangement located above a turntable comprising a housing, at least two apertured main supports and at least two apertured auxiliary supports in said housing, each pair of main supports and each pair of auxiliary supports being adapted to move laterally in opposite directions, a plate-shaped member located between said main and auxiliary supports and spacing the same apart a distance equal to the thickness of a record to be played, a control pin journalled for pivotal movement in said spindle, and a pair of substantially triangular-shaped levers each having a unilateral driving pin and two bilateral driving pins thereon, the latter projecting above and below said plate respectively, the apertures of said main and auxiliary supports being relatively large for relatively free movability therein of said bilateral driving pins, said levers being operatively connected to said control pin through said plate-shaped member whereby movement of said control pin results in the lateral movement of said supports.

3. An automatic record changer as claimed in claim 1 wherein each of said main supports have an outer peripheral surface which is bevelled inwardly and downwardly toward said spindle whereby upon the removal of a played stack of records the records themselves engage the bevelled surfaces to thereby cause retraction of the main supports permitting the record stack to pass over the main supports.

References Cited in the file of this patent

UNITED STATES PATENTS

| | | |
|---|---|---|
| 2,666,648 | Dale | Jan. 19, 1954 |
| 2,682,412 | Carlson | June 29, 1954 |
| 2,683,039 | Fortune | July 6, 1954 |
| 2,858,134 | Maris | Oct. 28, 1958 |
| 2,898,116 | Falk | Aug. 4, 1959 |

FOREIGN PATENTS

| | | |
|---|---|---|
| 1,073,502 | France | Sept. 27, 1954 |
| 1,130,776 | France | Oct. 8, 1956 |